Patented Nov. 14, 1922.

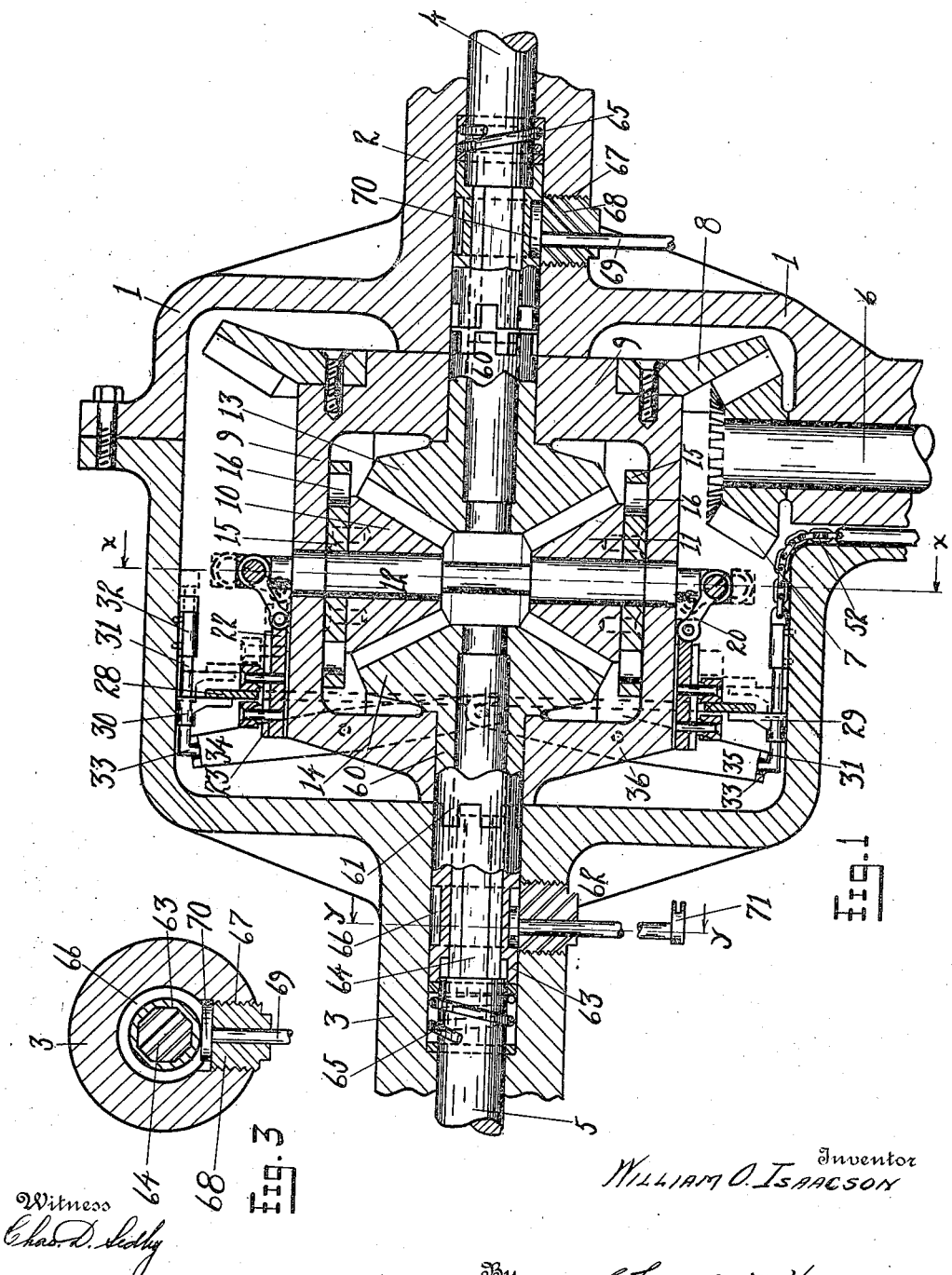

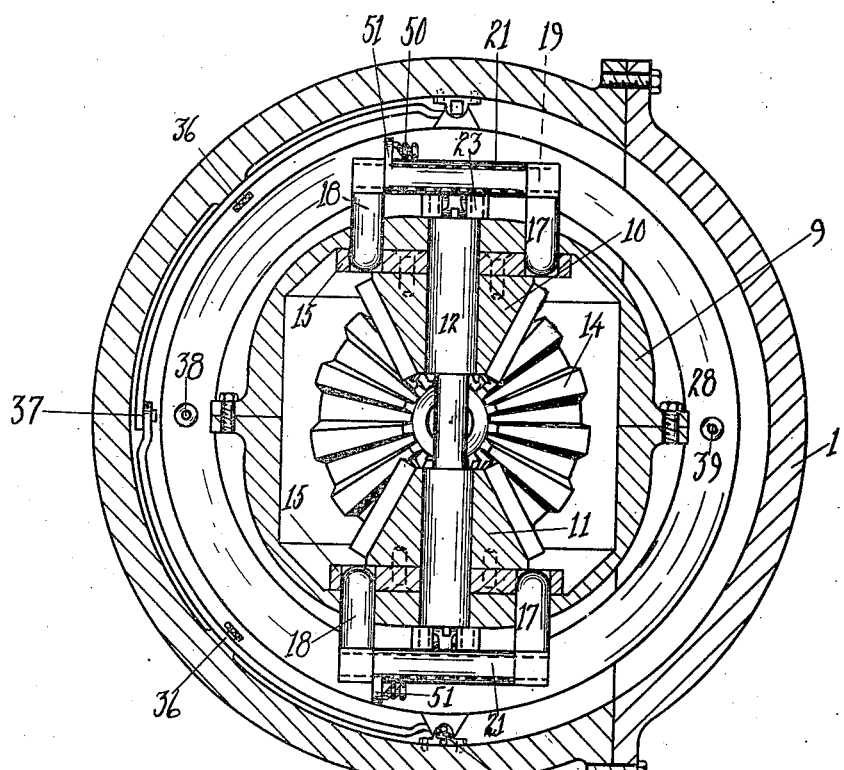
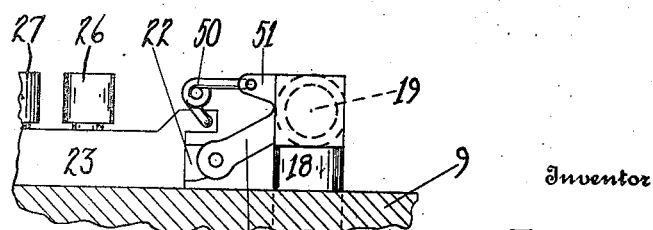

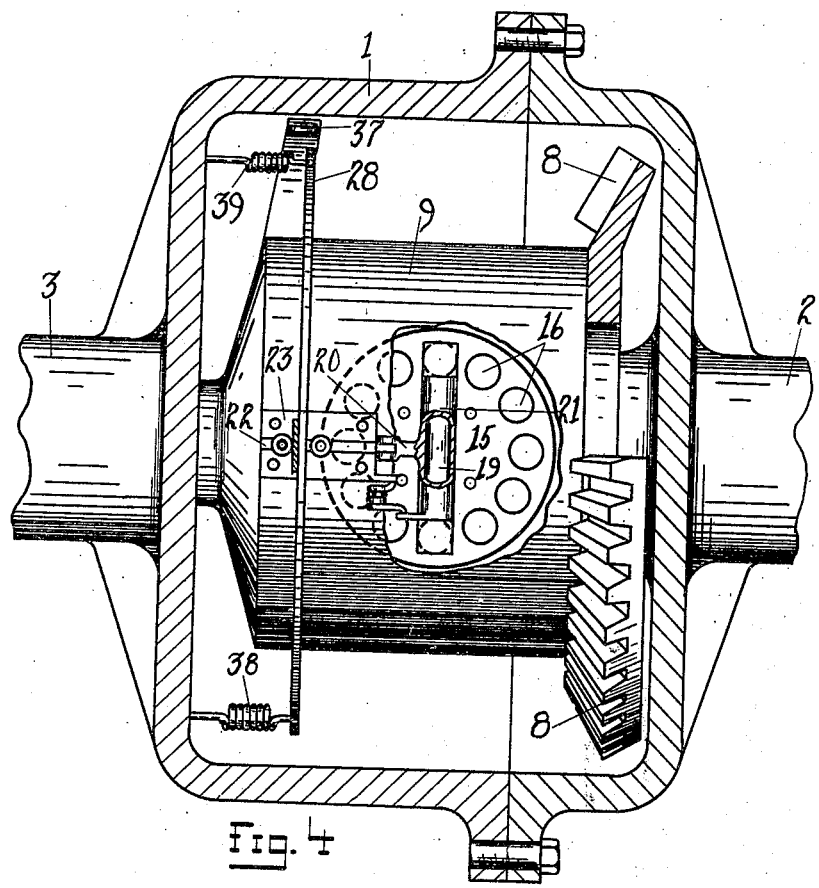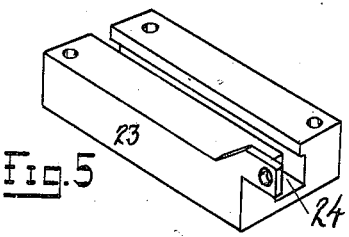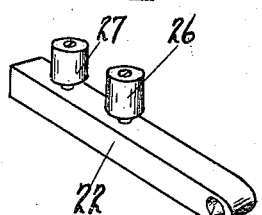

1,435,473

UNITED STATES PATENT OFFICE.

WILLIAM O. ISAACSON, OF CHICAGO, ILLINOIS.

DIFFERENTIAL GEARING.

Application filed September 13, 1918. Serial No. 253,978.

*To all whom it may concern:*

Be it known that I, WILLIAM O. ISAACSON, a citizen of the United States, residing at Chicago, county of Cook, State of Illinois, have invented a certain new and useful Improvement in Differential Gearing, and declare the following to be a full, clear, and exact description of the same, such as will enable others skilled in the art to which it pertains to make and use the same, reference being had to the accompanying drawings, which form a part of this specification.

This invention relates to differential gearing for use in the operation of the drive wheels of an automobile and an object thereof is to provide a mechanism normally operating as a differential gearing to differentially drive the two parts of the drive shaft of an automobile or similar vehicle and that is provided with means whereby the two parts of the shaft may be locked, one to the other, to drive in unison. In the operation of an automotive vehicle one of the wheels may spin while the other wheel remains stationary and the purpose of this device is to provide a means whereby the power of the vehicle may be applied to the wheel having traction and that may be released as the vehicle is extricated from the position in which the differential is inoperative to drive the vehicle. Another object of this invention is to provide a means for releasing either of the two parts of the drive shaft from operation by the differential mechanism whereby the power may be applied wholly to one wheel. The last named feature depends wholly upon the use of the locking arrangement above mentioned and hereinafter more fully described and operates in conjunction therewith. A further object is to secure the above named features in a construction that is comparatively simple and inexpensive and that is efficient for the work to be performed.

These and other objects and novel features of the invention are hereinafter more fully described and claimed, and shown in the accompanying drawings in which—

Fig. 1 is a vertical longitudinal section of a differential gearing embodying my invention.

Fig. 2 is a vertical cross section taken on line *x—x* of Fig. 1.

Fig. 3 is a vertical section taken on the line *y—y* of Fig. 1.

Fig. 4 is a plan view of the device, parts of the inclosing case and the mechanism being broken away to more clearly show the construction.

Fig. 5 is a detail in perspective on an enlarged scale showing one of the slide blocks use in the locking mechanism.

Fig. 6 is an enlarged detail view in perspective of the sliding bar used in the block shown in Fig. 5.

Fig. 7 is a side elevation of the locking pin.

The mechanism is inclosed in the usual casing 1 which may be of any type adapted for the purpose provided with bearings 2 and 3 for the shafts 4 and 5 respectively. These bearings are here shown as plain bearings but they may be of anti-friction type if desired. The shafts 4 and 5 are connected rigidly with the drive wheels respectively of the vehicle as is usual. Extending into the case is the propeller shaft 6 on which is secured the driving pinion 7 keyed thereto, as is usual. This pinion meshes with the bevel gear 8 secured directly to the inner casing 9 carrying the idler pinions 10 and 11. I preferably use but two of these pinions on diametrically opposite sides of the casing 9 and these pinions are rotatably mounted on the shaft 12 extending through both the pinions and supported by the casing 9 as shown. The shaft is preferably nonrotatable but may be rotatably mounted if desired. These pinions 10 and 11 both mesh on opposite sides with the companion driven gears 13 and 14 which are rotatable on the inner ends of the shafts 4 and 5 respectively when used with the releasing device hereinafter described. When not so used these gears 13 and 14 should be keyed or otherwise secured to rotate these shafts 4 and 5 as is usual. With the companion gears keyed to the two respective parts 4 and 5 of the drive shaft, the pinions by reason of engagement with the two companion gears 13 and 14 drive the same at equal speeds and by reason of the possibility of revolving on the shaft 12 allows one part of the shaft to rotate at a different speed than the speed of the other shaft with the power to deliver to both shafts equally. This is the usual construction generally employed in the usual differential gearing. Heretofore, with the usual construction, if one of the wheels rests upon a slippery surface such as ice and the other upon a road surface free from ice, one of the wheels would slip or spin and all of the power would be delivered to the spinning wheel. A purpose of this invention is to provide a means whereby the power is delivered to the wheel having traction and for this purpose I have provided a means for locking the pinions from revolution on the shaft 12. With the pinions locked from revolution and the companion gears 13 and 14 secured to the shafts, both wheels are driven in fixed relation so that power is applied to the wheel having traction. This enables the vehicle to be extricated from the position in which one of the wheels is slipping, whereupon the pinions may again be unlocked to rotate on the shaft 12.

In the construction here shown I have provided a locking mechanism operable at will of the driver to lock or unlock the pinions from rotation. For this purpose each pinion 10 and 11 is provided at the base with a plate 15 having a circular roll of apertures 16 therein and each plate is secured to the respective pinion so that it revolves with the pinion during the revolution of the pinions on the shaft 12. The casing 9 carries on opposite sides a pair of pins 17 and 18 attached to a cross shaft 19 and these pins in normally unlocked position rest in apertures in the casing 9 provided therefor. By forcing the pins 17 and 18 downward through the case into the apertures 16 provided in the plates 15, as is indicated in Fig. 2, the plates and consequently the pinions 10 and 11 are held from rotation on the shaft 12. By this arrangement the pinions operate normally as is usual in a differential of the type shown and may be locked when desired by projection of these pins into the apertured plates to apply the power of the motor to both wheels and prevent the spinning of one relative to the other.

Each pair of locking pins may be actuated by means of a link 20. In each instance the link is provided with a tubular portion 21 to receive the cross shaft 19 providing a pivoted connection for the link on the shaft. At the opposite end the link is pivotally connected to a bar 22 slidably mounted in a block 23 having a way 24 therefor. The two blocks and slide members are mounted on the inner casing 9 and are shown in detail in Figs. 5 and 6 and the link has a pin insertable in the aperture 25 formed in the end of the slide member. The slide member also carries rollers 26 and 27 near the end opposite the apertured end and a nonrotatable ring 28 is provided in the casing 1 surrounding the inner casing 9 engaging between the rollers, the rollers being carried in the casing 9 revolving therewith about the inner circumference of the stationery ring. The ring 28 is secured at opposite sides to similar brackets 29 and 30 which brackets are carried on similar rods 31, in each instance slidable in a bearing 32 provided therefor, attached to the inner surface of the outer housing 1. In the construction here shown each rod 31 has a hooked end 33 that engages an aperture provided at the end of the levers 34 and 35 respectively. These levers centrally between the ends thereof are pivotally mounted on the casing 9 as indicated at 36 and are connected together at the inner ends as indicated in Fig. 2 at 37. As shown in said figure, these levers are curved and supported on the inner surface of the outer casing and in the position of the levers shown in Fig. 1 the slide is drawn to its outermost position which is the position naturally assumed by the ring and connected parts by reason of the ring being connected to the casing by the coiled springs 38 and 39 which tend to draw the ring to the position shown in Fig. 1.

From the construction shown the tendency of the ring to draw toward the left of Fig. 1 draws the links 20 downward and tends to force the pins 17 and 18 into locking relation with the plates 15 as is shown in Fig. 7. There is also another spring for each pair of locking pins tending to force the pins into locking relation. This spring 50 has one end attached to the block 23 and one end attached to a lug 51 on the tubular member 21. When the slide is moved forward raising the pins, this spring is placed under tension and, when free to act, tends to force the pins into locking relation with the respective pinion plate. Therefore, normally the pins must be held out of locking relation. This is accomplished by a chain or cable member 52 which extends forward to the driver's seat of the vehicle and by pulling upon this chain member the ring 28 is forced to position shown by dotted lines shown in Fig. 1 raising the pins from locking position and allowing pinions 10 and 11 to rotate and providing a normal differential of the device in the usual operation of the vehicle upon condition arising where one of the wheels may spin. This chain member is released from its position releasing the ring to actuate by the springs 38 and 39 and also releases the pins to actuation by the springs 38, 39, and 50 which throws them into locking relation. The chain is merely connected to one of the rods 31 having the bent end engaging with the lower lever. The levers being pivoted together at the center, the operation of one lever operates the other so that the ring is actuated from opposite sides simultaneously.

Evidently this mechanism for raising or lowering the pins may be varied in many ways, the mechanism shown being one of many constructions serviceable for the purpose.

As an additional means for applying the entire power to one of a pair of driving wheels, I arrange the companion gears 13 and 14 with a hub 60 the end of which provides one member 61 of a jaw clutch, the other member 62 of which is on a sliding member 63 providing in the bearing 2 and 3 of the housing 1. The shafts 4 and 5 are provided with an octagonal portion 64 and the sliding member 63 is correspondingly shaped so that rotation of the member 63 causes rotation of the shaft. The element 63 may be splined to the shaft if so desired. At the rear end of each slide member 63 is provided a coiled spring 65 tending to force the member into engagement with the companion clutch 61 of the driven gears 13 or 14. This element is manually controlled and for this purpose I have provided a circumferential groove 66 in the outer surface thereof and the bearings 2 and 3 of the housing is provided with a threaded aperture 67 to receive a plug 68. In this plug is mounted a shaft 69 having on the end thereof a cam 70 which rides in the groove 66 of the sleeve 63. To the end of this shaft is attached an arm 71 whereby the shaft may be rotated and the cam turned. This cam may be turned as shown at the right of Fig. 1 to withdraw the sleeve from engagement with the companion gear 13. In this condition the shaft 4 will not be rotated by rotation of the gear 13 and, if the pinions 10 and 11 be locked at this time, the full power of the engine is transferred to the shaft 5. Normally, however, the sleeves are both in engagement with the gear clutches 61 so that both shafts are driven by rotation of the gears 13 and 14. By this sleeve arrangement described the spinning of a wheel may be stopped in that the shaft of the spinning wheel may be released from rotation thus preventing wear of the tire. While the device for locking the pinions 10 and 11 is not dependent for operation upon the sleeve clutches, the said sleeve arrangement is dependent upon the locking device as without the locking device the sleeve device is inoperative. That is, the locking device for the pinions may be used without the necessity of the use of the sleeve clutches, but in such a case the companion gears 13 and 14 must be secured to the respective parts of the shaft.

From the foregoing description it is evident that the principal object of the invention is secured by the locking device for locking pinions 10 and 11 from rotation on the shaft. By arranging the pins 17 and 18 with the rounded ends, the releasing of the pins to action by the springs automatically forces them into locking position and the ring may be released to actuation at the will of the operator through the use of the chain member 52. It is also evident that the construction is comparatively simple and inexpensive and with the use of the sleeve clutches described the entire power of the engine may be applied to either wheel at will.

Having thus briefly described my invention, what I claim is—

1. In a differential gearing, a two-part drive shaft, companion driven gears revolubly mounted on adjacent ends of said parts, the gears having hubs provided at the outer end with one member of a clutch device, a sleeve slidable on each of said parts in keyed relation therewith having a complemental clutch member, springs tending to hold the clutch members in engagement, said sleeves having a circumferential groove in the outer surface thereof, a casing having bearings for the said shafts and sleeve, a cam member mounted in the said casing and riding in the said grooves, a lever for each cam adapted to slide the sleeve whereby either sleeve may be withdrawn at will from engagement with the respective gear, clutch, a plurality of pinions each meshing with both of the said companion gears revoluble on their axes about the axes of the gears, and manually controlled means for locking the pinions from rotation on their axes.

2. In a differential gearing, a two-part drive shaft, companion driven gears on adjacent ends thereof adapted to drive the respective parts of the shaft, pinions each in mesh with both said gears, a casing revoluble about the axes of the said companion gears and carrying the said pinions, the pinions being revoluble on their axes whereby the companion gears may be differentially driven, and a locking device for preventing rotation of the pinions on their axes comprising a pin for each pinion carried by the casing and adapted to be projected in locked relation with each pinion, a sliding bar pivotally connected with the pin and carried by the said revoluble casing, movement of the slide in one direction withdrawing the pin from engagement with the gear and movement in the other direction inserting the pin, each slide having a pair of rollers, a nonrotatable ring engaging between the rollers of the said slides, springs tending to move the ring longitudinally of the shaft to project the pins into locked relation with the pinions, and manual means for moving the ring in the opposite direction.

3. In differential gearing, a two-part drive shaft, companion driven gears rotatably mounted on adjacent ends of the said two-part shaft, clutch devices for clutching the companion gears to the respective shaft ends to cause rotation thereof, a casing revoluble about the axes of the said gears, a pair of pinions revoluble with the casing and about their axes, the casing having a pair of apertures for each pinion equi-distantly positioned on opposite sides of the axis of rotation of each pinion, a pair of pins for each of the said pair of apertures, each pinion having a series of apertures or recesses arranged in a circle about its axis of rotation into which the respective pins may be projected, a spring-actuated means for each pair of pins tending to force the pins into the apertures of the respective pinion, a non-rotatable ring common to each of the said spring-actuated means and extending about the said casing, a housing for the said casing enclosing the casing and the gears, a slide on opposite sides of the housing, each slide having a lug engaging one face of the ring, a pair of levers pivotally mounted on the housing and engaging the slides, and means for simultaneously operating the levers to force the ring in one direction to disengage the pins.

In testimony whereof, I sign this specification.

WILLIAM O. ISAACSON.